US011641678B2

(12) United States Patent
Kopchinsky et al.

(10) Patent No.: US 11,641,678 B2
(45) Date of Patent: May 2, 2023

(54) SECURE WIRELESS NETWORKS FOR VEHICLE ASSIGNING AUTHORITY

(71) Applicant: Platform Science, inc., San Diego, CA (US)

(72) Inventors: Scott Kopchinsky, San Diego, CA (US); Don Son, San Diego, CA (US); John C. Kennedy, San Diego, CA (US); Emily Stuart, San Diego, CA (US)

(73) Assignee: Platform Science, inc., San Diego, CA (US)

( * ) Notice: Subject to any disclaimer, the term of this patent is extended or adjusted under 35 U.S.C. 154(b) by 0 days.

(21) Appl. No.: 17/726,192

(22) Filed: Apr. 21, 2022

(65) Prior Publication Data

US 2022/0248478 A1   Aug. 4, 2022

Related U.S. Application Data

(63) Continuation of application No. 16/870,955, filed on May 9, 2020, now Pat. No. 11,330,644, which is a
(Continued)

(51) Int. Cl.
*H04W 76/10* (2018.01)
*H04L 67/12* (2022.01)
(Continued)

(52) U.S. Cl.
CPC ............ *H04W 76/10* (2018.02); *H04L 67/12* (2013.01); *H04W 4/40* (2018.02); *H04W 76/19* (2018.02); *H04W 84/005* (2013.01); *H04W 84/12* (2013.01)

(58) Field of Classification Search
CPC ... H04W 76/10; H04W 76/19; H04W 84/005; H04W 84/12; H04L 67/12
See application file for complete search history.

(56) References Cited

U.S. PATENT DOCUMENTS 5,579,233 A   11/1996   Burns
5,954,773 A   9/1999   Luper
(Continued)

FOREIGN PATENT DOCUMENTS

CN   110176153   8/2019
GB   2449476   11/2008
(Continued)

OTHER PUBLICATIONS

International Search Report for PCT Application PCT/US2017/037825, dated Sep. 21, 2017.
(Continued)

*Primary Examiner* — Kyaw Z Soe
(74) *Attorney, Agent, or Firm* — Clause Eight; Michael Catania

(57) ABSTRACT

A system and method (600) of securely and accurately connecting mobile devices (110) to wireless networks in vehicles (210) for a predetermined work assignment by using encrypted wireless network configurations based on vehicle specific data is disclosed herein. The system comprises a vehicle (210) comprising an on-board computer (232) with a memory (231) having a vehicle identification number (233), a connector plug (235), and an motorized engine (234), a connected vehicle device (130) comprising a processor, a WiFi radio, a BLUETOOTH radio, a memory, and a connector for mating with the connector plug of the vehicle (210), and a mobile device (110) comprising a graphical user interface (335), a processor (310), a WiFi radio (307), a BLUETOOTH radio (306), and a cellular network interface (308).

20 Claims, 9 Drawing Sheets

Related U.S. Application Data continuation-in-part of application No. 16/416,396, filed on May 20, 2019, now Pat. No. 10,652,935, which is a continuation-in-part of application No. 16/118,436, filed on Aug. 31, 2018, now Pat. No. 10,334,638, which is a continuation of application No. 15/917,633, filed on Mar. 11, 2018, now Pat. No. 10,070,471, which is a continuation of application No. 15/624,814, filed on Jun. 16, 2017, now Pat. No. 9,961,710.

(60) Provisional application No. 62/352,014, filed on Jun. 19, 2016.

(51) Int. Cl.
  *H04W 76/19* (2018.01)
  *H04W 4/40* (2018.01)
  *H04W 84/00* (2009.01)
  *H04W 84/12* (2009.01)

(56) References Cited

U.S. PATENT DOCUMENTS

| | | |
|---|---|---|
| 5,995,898 A | 11/1999 | Tuttle |
| 6,292,724 B1 | 9/2001 | Apsell et al. |
| 6,526,341 B1 | 2/2003 | Bird et al. |
| 6,611,686 B1 | 8/2003 | Smith et al. |
| 6,651,001 B2 | 11/2003 | Apsell |
| 6,735,150 B2 | 5/2004 | Rothman |
| 6,925,308 B2 | 8/2005 | Goldsmith et al. |
| 7,043,365 B2 | 5/2006 | Inbar et al. |
| 7,079,230 B1 | 7/2006 | McInerney et al. |
| 7,092,803 B2 | 8/2006 | Kapolka et al. |
| 7,327,250 B2 | 2/2008 | Harvey |
| 7,350,707 B2 | 4/2008 | Barkan |
| 7,555,378 B2 | 6/2009 | Larschan et al. |
| 7,616,105 B2 | 11/2009 | Macielinski et al. |
| 7,725,216 B2 | 5/2010 | Kim |
| 8,626,144 B2 | 1/2014 | Talty et al. |
| 8,626,568 B2 | 1/2014 | Warkentin et al. |
| 8,789,161 B2 | 7/2014 | Jeal |
| 8,855,626 B2 | 10/2014 | O'Toole et al. |
| 9,032,493 B2 | 5/2015 | Lortz et al. |
| 9,064,422 B2 | 6/2015 | Mohn et al. |
| 9,147,335 B2 | 9/2015 | Raghunathan et al. |
| 9,215,590 B2 | 12/2015 | Bondesen et al. |
| 9,256,992 B2 | 2/2016 | Davidson |
| 9,262,934 B2 | 2/2016 | Mohn et al. |
| 9,275,010 B2 | 3/2016 | Kote et al. |
| 9,376,090 B2 | 6/2016 | Gennermann |
| 9,390,628 B2 | 7/2016 | Mohn et al. |
| 9,424,751 B2 | 8/2016 | Hodges et al. |
| 9,445,447 B2 | 9/2016 | Pal et al. |
| 9,544,768 B2 | 1/2017 | Steffey et al. |
| 9,578,668 B2 | 2/2017 | Sim |
| 9,632,506 B2 | 4/2017 | Wellman et al. |
| 9,595,018 B2 | 6/2017 | Tang |
| 9,671,241 B2 | 6/2017 | Tang |
| 9,754,425 B1 | 9/2017 | Iqbal et al. |
| 9,961,710 B2 | 5/2018 | Son et al. |
| 10,070,471 B2 | 9/2018 | Son et al. |
| 10,074,220 B2 | 9/2018 | Cawse et al. |
| 10,255,575 B2 | 4/2019 | Warkentin et al. |
| 10,255,606 B2 | 4/2019 | Harter et al. |
| 10,334,638 B2 | 6/2019 | Son et al. |
| 10,475,258 B1 | 11/2019 | Son et al. |
| 10,652,935 B1 | 5/2020 | Son et al. |
| 10,803,682 B1 | 10/2020 | Son et al. |
| 10,829,063 B1 | 11/2020 | Konrardy et al. |
| 10,917,921 B2 | 2/2021 | Kennedy et al. |
| 10,930,091 B1 | 2/2021 | Son et al. |
| 11,197,329 B2 | 12/2021 | Kennedy et al. |
| 11,197,330 B2 | 12/2021 | Kennedy et al. |
| 11,330,644 B2 | 5/2022 | Kopchinsky et al. |
| 11,419,163 B2 | 8/2022 | Kennedy et al. |
| 11,438,938 B1 | 9/2022 | Kennedy et al. |
| 11,528,759 B1 | 12/2022 | Kennedy et al. |
| 2008/0137860 A1 | 6/2008 | Silvernail |
| 2009/0099724 A1 | 4/2009 | Kranz et al. |
| 2009/0276115 A1 | 11/2009 | Chen |
| 2010/0279733 A1 | 11/2010 | Karsten et al. |
| 2011/0080256 A1 | 4/2011 | Mehalschick, Sr. |
| 2012/0161927 A1 | 6/2012 | Pierfelice et al. |
| 2012/0254960 A1 | 10/2012 | Lortz et al. |
| 2012/0262283 A1 | 10/2012 | Biondo et al. |
| 2013/0017816 A1 | 1/2013 | Talty et al. |
| 2013/0046846 A1 | 2/2013 | Mason et al. |
| 2013/0110296 A1 | 5/2013 | Khoo et al. |
| 2013/0304276 A1 | 11/2013 | Flies |
| 2014/0122187 A1 | 5/2014 | Warkentin et al. |
| 2014/0162598 A1 | 6/2014 | Villa-Real |
| 2014/0213176 A1 | 7/2014 | Mendelson |
| 2014/0223235 A1 | 8/2014 | Gundlapalli et al. |
| 2014/0232569 A1 | 8/2014 | Skinder et al. |
| 2014/0309891 A1 | 10/2014 | Ricci |
| 2014/0309892 A1 | 10/2014 | Ricci |
| 2015/0099500 A1 | 4/2015 | Chalmers |
| 2015/0120135 A1 | 4/2015 | Lawrenson |
| 2015/0147974 A1 | 5/2015 | Tucker et al. |
| 2015/0215986 A1 | 7/2015 | Lei et al. |
| 2015/0339334 A1 | 11/2015 | Hanke |
| 2015/0365979 A1 | 12/2015 | Park |
| 2016/0011001 A1 | 1/2016 | Emory et al. |
| 2016/0066127 A1 | 3/2016 | Choi et al. |
| 2016/0084657 A1 | 3/2016 | Schilling et al. |
| 2016/0150588 A1 | 5/2016 | Yae |
| 2016/0247153 A1 | 8/2016 | Leseky |
| 2016/0277923 A1 | 9/2016 | Steffey et al. |
| 2016/0334236 A1 | 11/2016 | Mason et al. |
| 2016/0343255 A1 | 11/2016 | Warren |
| 2017/0011561 A1 | 1/2017 | Makke et al. |
| 2017/0017927 A1 | 1/2017 | Domnick et al. |
| 2017/0104728 A1 | 4/2017 | Girard et al. |
| 2017/0178035 A1 | 6/2017 | Grimm et al. |
| 2017/0367142 A1 | 12/2017 | Son et al. |
| 2018/0376522 A1 | 12/2018 | Son et al. |
| 2019/0066041 A1 | 2/2019 | Hance et al. |
| 2019/0156096 A1 | 5/2019 | Lin et al. |
| 2019/0179029 A1 | 6/2019 | Pacala et al. |
| 2019/0255963 A1 | 8/2019 | Goei |
| 2019/0256096 A1 | 8/2019 | Graf et al. |
| 2019/0293439 A1* | 9/2019 | Hiruta .................. H04L 9/083 |
| 2020/0125870 A1 | 4/2020 | Nishimura et al. |
| 2020/0184808 A1 | 6/2020 | Ewert |
| 2020/0211376 A1 | 7/2020 | Roka |
| 2020/0280827 A1 | 9/2020 | Fechtal et al. |
| 2020/0281030 A1 | 9/2020 | Kopchinsky et al. |
| 2020/0287775 A1 | 9/2020 | Khasis |
| 2020/0294401 A1 | 9/2020 | Kerecsen |
| 2020/0329512 A1 | 10/2020 | Kennedy et al. |
| 2020/0344824 A1 | 10/2020 | Kennedy et al. |

FOREIGN PATENT DOCUMENTS

| | | |
|---|---|---|
| KR | 20130041660 | 4/2013 |
| KR | 20130041660 A | 4/2013 |
| WO | WO9637079 | 11/1996 |
| WO | WO2016/012064 | 1/2016 |
| WO | WO2021055384 | 3/2021 |
| WO | WO2022026344 | 2/2022 |
| WO | WO2022072287 | 4/2022 |
| WO | WO2022081494 | 4/2022 |
| WO | WO2022109298 | 5/2022 |

OTHER PUBLICATIONS

European Search Report for EP Application 17815967.9 dated Dec. 4, 2019.
Office Action for U.S. Appl. No. 15/624,814, dated Aug. 22, 2017.
International Search Report and Written Opinion for PCT Application PCT/US2020/032389, dated Jul. 2, 2020.

(56) References Cited

OTHER PUBLICATIONS

International Search Report and Written Opinion for PCT Application PCT/US2020/027032, dated May 28, 2020.
International Search Report and Written Opinion for PCT Application PCT/US2020/039639, dated Sep. 28, 2020.
International Search Report for PCT Application PCT/US2020/050940 dated Dec. 3, 2020.
International Search Report for PCT Application PCT/US2020/041788, dated Oct. 22, 2020.
International Search Report for PCT Application PCT/US2021/054449, dated Dec. 23, 2021.
International Search Report for PCT Application PCT/US2021/043096, dated Nov. 3, 2021.
International Search Report for PCT Application PCT/US2021/052247, dated Jan. 13, 2022.
Intl Search Report PCT/US2021/054449, dated Dec. 23, 2021.
Written Opinion PCT/US2021/054449, dated Nov. 19, 2021.
Written Opinion and Search Report PCT/US2021/060137, dated Feb. 11, 2021.
Written Opinion and Search Report PCT/US2022/024296, dated Jul. 22, 2022.
Written Opinion and Search Report PCT/US2022/020822, dated Jun. 11, 2022.
Siegel et al., A Survey of the connected vehicle landscape-Architectures, enabling technologies, applications and development areas, IEEE Transactions on Intelligent TranspoitaLion Systems 19.8 (2017): 2391-2406, Oct. 4, 2017.
International Search Report and Written Opinion for PCT Application PCT/US2022/033096, dated Sep. 6, 2022.
International Search Report and Written Opinion for PCT Application PCT/US2021/043096, dated Nov. 3, 2021.
Written Opinion for PCT Application PCT/US2021/052247, dated Jan. 13, 2022.

\* cited by examiner

SECURE WIRELESS NETWORKS FOR VEHICLE ASSIGNING AUTHORITY

CROSS REFERENCES TO RELATED APPLICATIONS

The Present Application is a continuation application of U.S. patent application Ser. No. 16/870,955, filed on May 9, 2020, which is a continuation-in-part application of U.S. patent application Ser. No. 16/416,396, filed on May 20, 2019, now U.S. Pat. No. 10,652,935, issued on May 12, 2020, which is a continuation-in-part application of U.S. patent application Ser. No. 16/118,436, filed on Aug. 31, 2018, now U.S. Pat. No. 10,334,638, issued on Jun. 25, 2019, which is a continuation application of U.S. patent application Ser. No. 15/917,633, filed on Mar. 11, 2018, now U.S. Pat. No. 10,070,471, issued on Sep. 4, 2018, which is a continuation application of U.S. patent application Ser. No. 15/624,814, filed on Jun. 16, 2017, now U.S. Pat. No. 9,961,710, issued on May 1, 2018, which claims priority to U.S. Provisional Patent Application No. 62/352,014, filed on Jun. 19, 2016, now expired, each of which is hereby incorporated by reference in its entirety.

STATEMENT REGARDING FEDERALLY SPONSORED RESEARCH OR DEVELOPMENT

Not Applicable

BACKGROUND OF THE INVENTION

Field of the Invention

The present invention generally relates to wireless networks for vehicles.

Description of the Related Art

The prior art discusses various techniques for wireless networks for vehicles.

U.S. Pat. No. 9,215,590 for Authentication Using Vehicle Data Pairing discloses the wireless pairing of a portable device with an on-board computer of a vehicle for authenticating a transaction with a third party.

General definitions for terms utilized in the pertinent art are set forth below.

Beacon is a management frame that contains all of the information about a network. In a WLAN, Beacon frames are periodically transmitted to announce the presence of the network.

BLUETOOTH technology is a standard short range radio link that operates in the unlicensed 2.4 gigaHertz band.

Code Division Multiple Access ("CDMA") is a spread spectrum communication system used in second generation and third generation cellular networks, and is described in U.S. Pat. No. 4,901,307.

FTP or File Transfer Protocol is a protocol for moving files over the Internet from one computer to another.

GSM, Global System for Mobile Communications is a second generation digital cellular network.

Hypertext Transfer Protocol ("HTTP") is a set of conventions for controlling the transfer of information via the Internet from a web server computer to a client computer, and also from a client computer to a web server, and Hypertext Transfer Protocol Secure ("HTTPS") is a communications protocol for secure communication via a network from a web server computer to a client computer, and also from a client computer to a web server by at a minimum verifying the authenticity of a web site.

Internet is the worldwide, decentralized totality of server computers and data-transmission paths which can supply information to a connected and browser-equipped client computer, and can receive and forward information entered from the client computer.

Media Access Control (MAC) Address is a unique identifier assigned to the network interface by the manufacturer.

Memory generally includes any type of integrated circuit or storage device configured for storing digital data including without limitation ROM, PROM, EEPROM, DRAM, SDRAM, SRAM, flash memory, and the like.

Organizationally Unique Identifier (OUI) is a 24-bit number that uniquely identifies a vendor, manufacturer, or organization on a worldwide basis. The OUI is used to help distinguish both physical devices and software, such as a network protocol, that belong to one entity from those that belong to another.

Probe Request: A frame that contains the advertisement IE for a device that is seeking to establish a connection with a proximate device.

Probe Response: A frame that contains the advertisement IE for a device. The Probe Response is sent in response to a Probe Request.

Processor generally includes all types of processors including without limitation microprocessors, general purpose processors, gate arrays, array processors, application specific integrated circuits (ASICs) and digital signal processors.

SCP (Secure Connection Packet) is used to provide authentication between multiple devices or a local party and remote host to allow for secure communication or the transfer of computer files.

SSID (Service Set Identifier) is a 1 to 32 byte string that uniquely names a wireless local area network.

Transfer Control Protocol/Internet Protocol ("TCP/IP") is a protocol for moving files over the Internet.

URL or Uniform Resource Locator is an address on the World Wide Web.

User Interface or UI is the junction between a user and a computer program. An interface is a set of commands or menus through which a user communicates with a program. A command driven interface is one in which the user enter commands. A menu-driven interface is one in which the user selects command choices from various menus displayed on the screen.

Web-Browser is a complex software program, resident in a client computer, that is capable of loading and displaying text and images and exhibiting behaviors as encoded in HTML (HyperText Markup Language) from the Internet, and also from the client computer's memory. Major browsers include MICROSOFT INTERNET EXPLORER, NETSCAPE, APPLE SAFARI, MOZILLA FIREFOX, and OPERA.

Web-Server is a computer able to simultaneously manage many Internet information-exchange processes at the same time. Normally, server computers are more powerful than client computers, and are administratively and/or geographically centralized. An interactive-form information-collection process generally is controlled from a server computer, to which the sponsor of the process has access.

Wireless Application Protocol ("WAP") is an open, global specification that empowers users with mobile wireless communication devices (such as mobile phones) to easily access data and to interact with Websites over the Internet through such mobile wireless communication device. WAP works with most wireless communication networks such as CDPD, CDMA, GSM, PDC, PHS, TDMA, FLEX, reflex, iDEN, TETRA, DECT, DataTAC, Mobitex and GRPS. WAP can be built on most operating systems including PalmOS, WINDOWS, CE, FLEXOS, OS/9, JavaOS and others.

WAP Push is defined as an encoded WAP content message delivered (pushed) to a mobile communication device which includes a link to a WAP address.

Wireless AP (access point) is a node on the wireless local area network (WLAN) that allows wireless devices to connect to a wired network using Wi-Fi, or related standards.

There is a need for securely connecting a device to a single access point in a vehicle, while preventing malicious users from detecting and connecting to a wireless network published on a vehicle.

BRIEF SUMMARY OF THE INVENTION

The present invention provides a system and method of securely and accurately connecting mobile devices to wireless networks in vehicles by using encrypted wireless network configurations based on vehicle specific data.

One aspect of the present invention is a method for a secure connection to a wireless network of a vehicle. The method includes generating, at a server, definitions for a SCP for assigning authority for a vehicle. The method also includes transmitting the definitions for the SCP from the server to a CVD and a mobile device. The method also includes compiling the SCP at the CVD to generate a CVD compiled SCP. The method also includes transmitting the CVD compiled SCP to the server for authorization. The method also includes transmitting authorization for the CVD compiled SCP from the server to the CVD for creation of a validated SCP. The method also includes generating a dataset at the mobile device to compile a mobile device compiled SCP. The method also includes broadcasting at a CVD a wireless network with a hidden and hashed SSID unique to the vehicle, the hidden and hashed SSID generated from the validated SCP. The method also includes generating at the mobile device the hashed SSID and a passphrase from the dataset, which allows the mobile device connect to the wireless network. The method also includes searching at a mobile device for a vehicle having the CVD broadcasting the wireless network in a hidden mode. The method also includes connecting the mobile device with the CVD. The CVD comprises a processor, a WiFi radio, a BLUETOOTH radio, a memory, and a connector for mating with a connector plug of a vehicle. The mobile device comprises a graphical user interface, a BLUETOOTH radio, a processor, a WiFi radio and a cellular network interface.

Another aspect of the present invention is a system for vehicle to mobile device secure wireless communications. The system comprises a vehicle, a CVD, a mobile device and a passive communication device. The vehicle comprises an on-board computer with a memory having a vehicle identification number (VIN), a connector plug, and a motorized engine. The CVD comprises a processor, a WiFi radio, a BLUETOOTH radio, a memory, and a connector for mating with the connector plug of the vehicle. The mobile device comprises a graphical user interface, a mobile application, a processor, a WiFi radio, and a cellular network interface. The passive communication device operates on a BLUETOOTH communication protocol. The server is configured to generate a plurality of definitions for a SCP for assigning authority for the vehicle. The server is configured to transmit the plurality of definitions for the SCP from the server to the CVD and the mobile device. The CVD is configured to compile the SCP to generate a CVD compiled SCP. The CVD is configured to transmit the CVD compiled SCP to the server for authorization. The server is configured to transmit authorization for the CVD compiled SCP to the CVD for creation of a validated SCP. The mobile device is configured to generating a dataset to compile a mobile device compiled SCP. The CVD is configured to broadcast a wireless network with a hidden and hashed SSID unique to the vehicle, the hidden and hashed SSID generated from the validated SCP. The mobile device is configured to generate the hashed SSID and a passphrase from the dataset, which allows the mobile device connect to the wireless network. The mobile device is configured to search for a vehicle having the CVD broadcasting the wireless network in a hidden mode. The mobile device is configured to connect to the CVD over the wireless network.

Yet another aspect of the present invention is a method for a secure connection to a wireless network of a vehicle. The method includes transmitting a plurality of definitions for a SCP from a server to a CVD and a mobile device. The method also includes receiving at the server a CVD compiled SCP for authorization. The method also includes transmitting authorization for the CVD compiled SCP from the server to the CVD for creation of a validated SCP. The method also includes generating a dataset at the mobile device to compile a mobile device compiled SCP. The method also includes broadcasting at a CVD a wireless network with a hidden and hashed SSID unique to the vehicle, the hidden and hashed SSID generated from the validated SCP. The method also includes generating at the mobile device the hashed SSID and a passphrase from the dataset, which allows the mobile device connect to the wireless network. The method also includes connecting the mobile device with the CVD over the wireless network.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
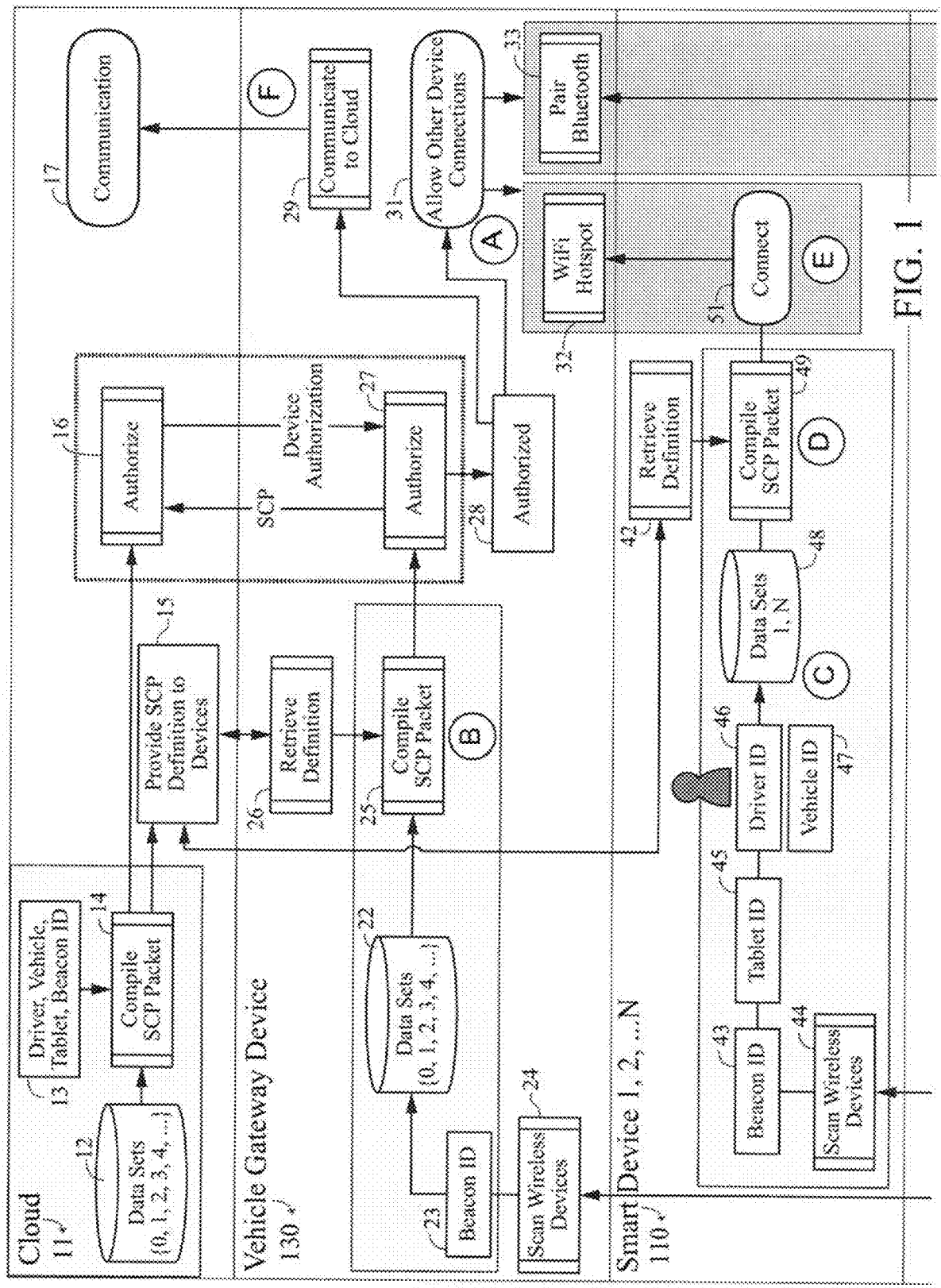
FIG. 1 is a block diagram of system for a secure communication protocol for connecting a wireless device to a single access point in a vehicle.
Figure 1A:
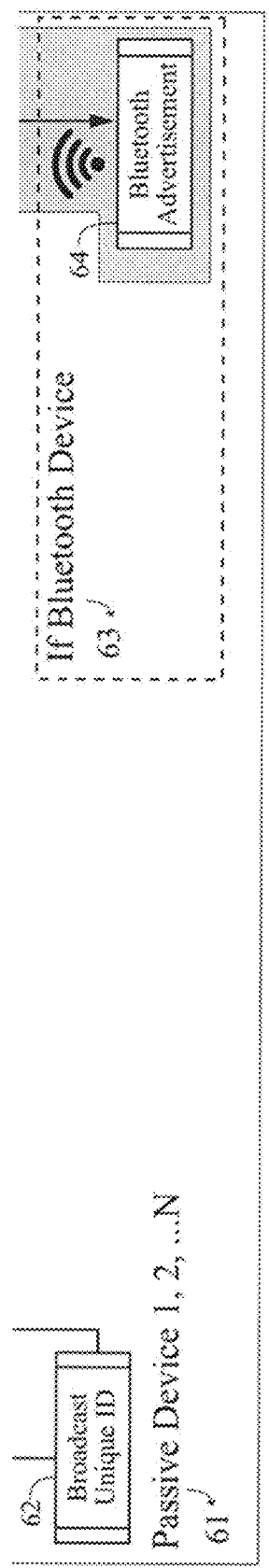
FIG. 1A is a continuation of the block diagram of FIG. 1.

A system 10 for securely connecting a wireless device to a single access point in a vehicle for a predetermined work assignment is set for the FIGS. 1 and 1A. The system 10 preferably comprises a remote server (cloud) 11, a vehicle gateway device 130, a smart device 110 and a passive device 61. The vehicle gateway device 130 is preferably a connected vehicle device ("CVD").

The server/cloud 11 accesses dataset 12 and obtains driver information. Vehicle information, mobile device information (MAC address), passive device information (beacon ID) and other information to compile a SCP 14. At block 15, the server 11 provides SCP definitions to the vehicle gateway device 130 and the mobile device 110. At block 16 the server/cloud 11 authorizes the SCP. At block 17, the server/cloud 11 communicates with the vehicle gateway device 130.

The vehicle gateway device 130 uses datasets 22, with the beacon ID 23, a scan of wireless devices 24 along with the SCP definitions 26 received from the server/cloud 11 to compile a CVD compiled SCP 25. The CVD compiled SCP packet is sent to the cloud/server 11 at block 16 and authorization/validation of the CVD compiled SCP is received at block 27. At block 28 the SCP is authorized for broadcasting at the vehicle gateway device 130 a wireless network with a hidden and hashed SSID unique to the vehicle, the hidden and hashed SSID generated from the validated SCP. At block 29, the vehicle gateway device 130 communicates the broadcast with the server/cloud 11. At block 31, the vehicle gateway device 130 communicates with other devices, namely the smart device 110 over preferably a WiFi hotspot 32 and the passive device 61 by pairing using a BLUETOOTH communication protocol at block 33.

At block 49, the smart device (mobile device) 110 compiles a complied mobile device SCP from the SCP definitions 42, the data sets 48, the beacon ID 43, the Tablet ID 45, a driver ID 46, a vehicle ID 47 and scan of wireless devices 44. The mobile device 110 generates the hashed SSID and a passphrase from the complied mobile device SCP. At block 51, the mobile device 110 connects to the WiFi hotspot 32 of the vehicle device gateway 130.

The passive device 61 broadcast a unique ID at block 62 which is received by the mobile device 110 and the vehicle gateway device 130. At block 63, if a BLUETOOTH device, it broadcasts a BLUETOOTH advertisement at block 64.

The SCP is defined by an assigning authority in the server/cloud 11. The server/cloud 11 sends the SCP definition and any other required data in datasets to the CVD 130 and the mobile device 110. The CVD 130 adds the contextual data from local datasets to the sever-sent data to compile its SCP based definition. The local datasets include data wirelessly scanned from passive devices, preferably transmitting a BLUETOOTH beacon. Other local datasets include information from the vehicle. The CVD 130 sends its compiled SCP to the server 11 for authorization. The server 11 verifies the CVD compiled SCP, and if valid, the server 11 transmits a validation/approval signal to the CVD 130. The CVD then generates an access point SSID/passphrase with SCP. Likewise, the mobile device 110 utilizes contextual data from local datasets to compile its SCP based on the definitions. The mobile device 110 connects to the access point of the CVD 130 using the SCP. The CVD 130 and the mobile device 110 also connect to the passive device 61 since it is part of the SCP definition.

A predetermined work assignment is a temporal event with a fixed start and completion based on assignable boundary conditions. The assignable boundary condition is at least one of a predetermined time period, a geographical destination, and a set route. Alternatively, the assignable boundary condition is any feature with a beginning and a termination. The assigning authority is performed by a person or persons, who have the appropriate authority and mechanisms to assign specific tasks and assets to a specific vehicle and vehicle operator or custodian, and to assign workflow assignments to same. The predetermined work assignment is assigned to a known person or entity that has its own primary networked device accessible through a password protected user interface, a specific name and password that auto-populates or otherwise automatically satisfies a plurality of credentials requirements, wherein the plurality of credential requirements are automatically available or revoked based on the assignable boundary condition identified in a pairing event.

The CVD 130 broadcasts a Wifi wireless network with a hidden and hashed SSID unique to the host vehicle and protected by a unique, dynamically generated and hashed passphrase. The vehicle ID is entered into an application on the tablet that is then converted to the same hashed SSID and passphrase, which allows the tablet to attempt to connect to the corresponding CVD Wifi network and begin communication.

Figure 2:
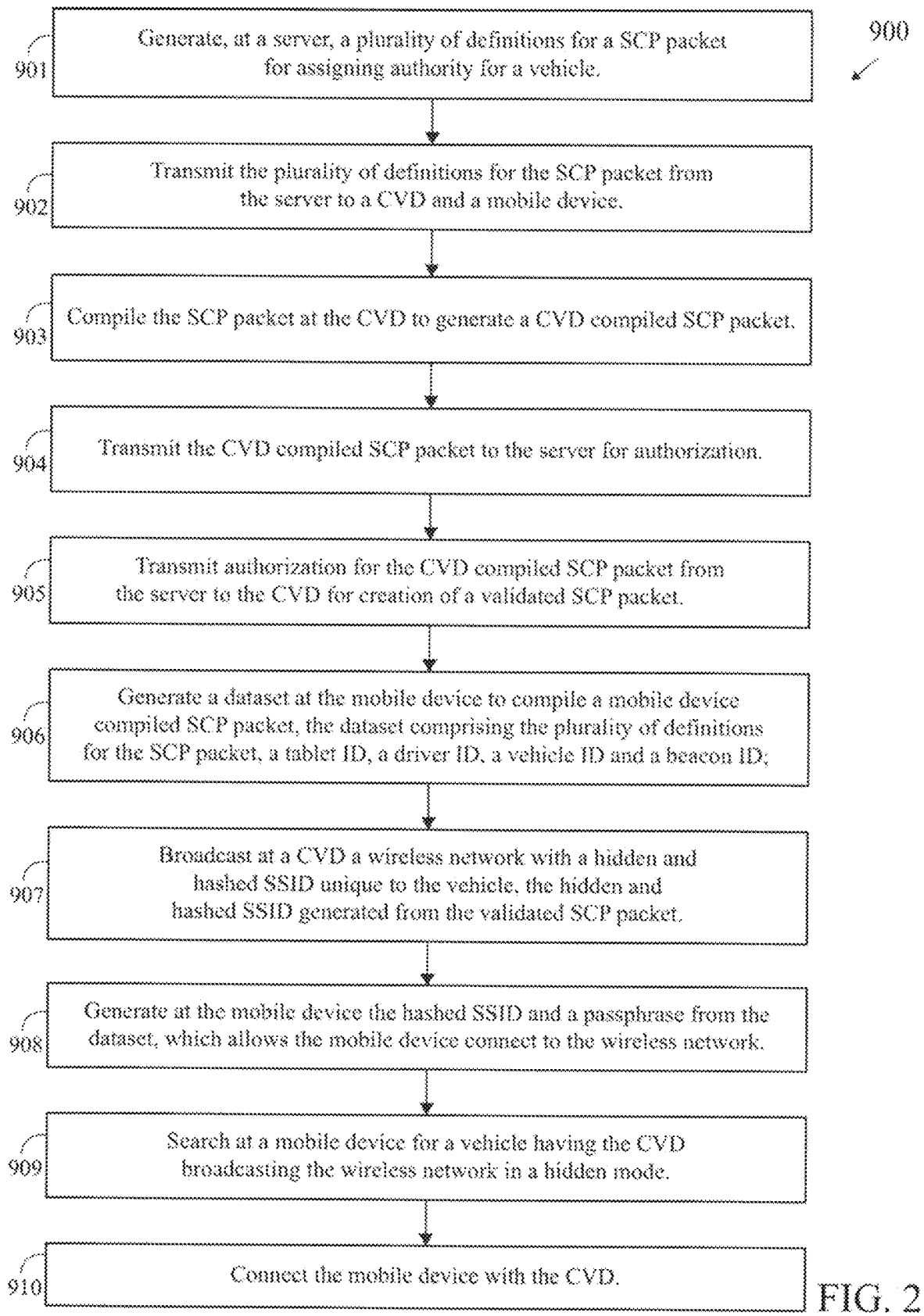
FIG. 2 is a flow chart of a method for a secure connection to a wireless network of a vehicle.

A method 900 for a secure connection to a wireless network of a vehicle is shown in FIG. 2. At block 901, a server generates definitions for a SCP for assigning authority for a vehicle. At block 902 the server transmits the definitions for the SCP packet to a CVD and a mobile device. At block 903, the CVD compiles the SCP to generate a CVD compiled SCP. At block 904, the CVD transmits the CVD compiled SCP to the server for authorization. At block 905, the server transmits authorization for the CVD compiled SCP from to the CVD for creation of a validated SCP. At block 906, the mobile device generates a dataset to compile a mobile device compiled SCP. At block 907, the CVD broadcasts at a wireless network with a hidden and hashed SSID unique to the vehicle. The hidden and hashed SSID is generated from the validated SCP. At block 908, the mobile device generates the hashed SSID and a passphrase from the dataset, which allows the mobile device connect to the wireless network. At block 909, the mobile device searches for a vehicle having the CVD broadcasting the wireless network in a hidden mode. At block 910, the mobile device securely connects with the CVD.

One embodiment is a system for vehicle to mobile device secure wireless communications. The system comprises a vehicle 210, a CVD 130, a mobile device 110 and a passive communication device 61. The vehicle 210 comprises an on-board computer with a memory having a vehicle identification number (VIN), a connector plug, and a motorized engine. The CVD 130 comprises a processor, a WiFi radio, a BLUETOOTH radio, a memory, and a connector for mating with the connector plug of the vehicle. The mobile device 110 comprises a graphical user interface, a mobile application, a processor, a WiFi radio, and a cellular network interface. The passive communication device 61 operates on a BLUETOOTH communication protocol. The server 11 is configured to generate a plurality of definitions for a SCP for assigning authority for the vehicle. The server 11 is configured to transmit the plurality of definitions for the SCP from the server to the CVD 130 and the mobile device 110. The CVD 130 is configured to compile the SCP packet to generate a CVD compiled SCP. The CVD 130 is configured to transmit the CVD compiled SCP to the server 11 for authorization. The server 11 is configured to transmit authorization for the CVD compiled SCP to the CVD 130 for creation of a validated SCP. The mobile device 110 is configured to generating a dataset to compile a mobile device compiled SCP. The CVD 130 is configured to broadcast a wireless network with a hidden and hashed SSID unique to the vehicle, the hidden and hashed SSID generated from the validated SCP. The mobile device 110 is configured to generate the hashed SSID and a passphrase from the dataset, which allows the mobile device connect to the wireless network. The mobile device 110 is configured to search for a vehicle having the CVD broadcasting the wireless network in a hidden mode. The mobile device 110 is configured to connect to the CVD 130 over the wireless network.

The dataset preferably comprises at least one of a plurality of definitions for the SCP, a tablet ID, a driver ID, a vehicle ID, a beacon ID, identified or defined entity/participant to the transaction, descriptions, actions, or states of thing, characteristics of identifiable devices, when present in a certain proximity and/or context.

Optionally, the mobile device 110 connects to a passive device, the passive device operating on a BLUETOOTH communication protocol. The passive device 61 is preferably a BLUETOOTH enabled device advertising a unique ID as a beacon or a complex system (speaker, computer, etc.) that emits BLUETOOTH enabled device advertising a unique ID as a beacon.

The mobile device 110 preferably receives input from a driver of the vehicle, and/or the server 11 contains the assigning authority that generates the SCP definitions.

The passive device 61 is preferably an internal device in the vehicle or an external device posted on a gate to a facility and generating a beacon. The beacon from the passive device is preferably a mechanism to ensure that the connection between the mobile device 110 and the CVD 130 occurs at a specific physical location dictated by the assigning authority through the server 11. Preferably, the automatic connection between the mobile device 110 and the CVD occurs because the assigning authority, through the server, has dictated that it occur.

Figure 3:
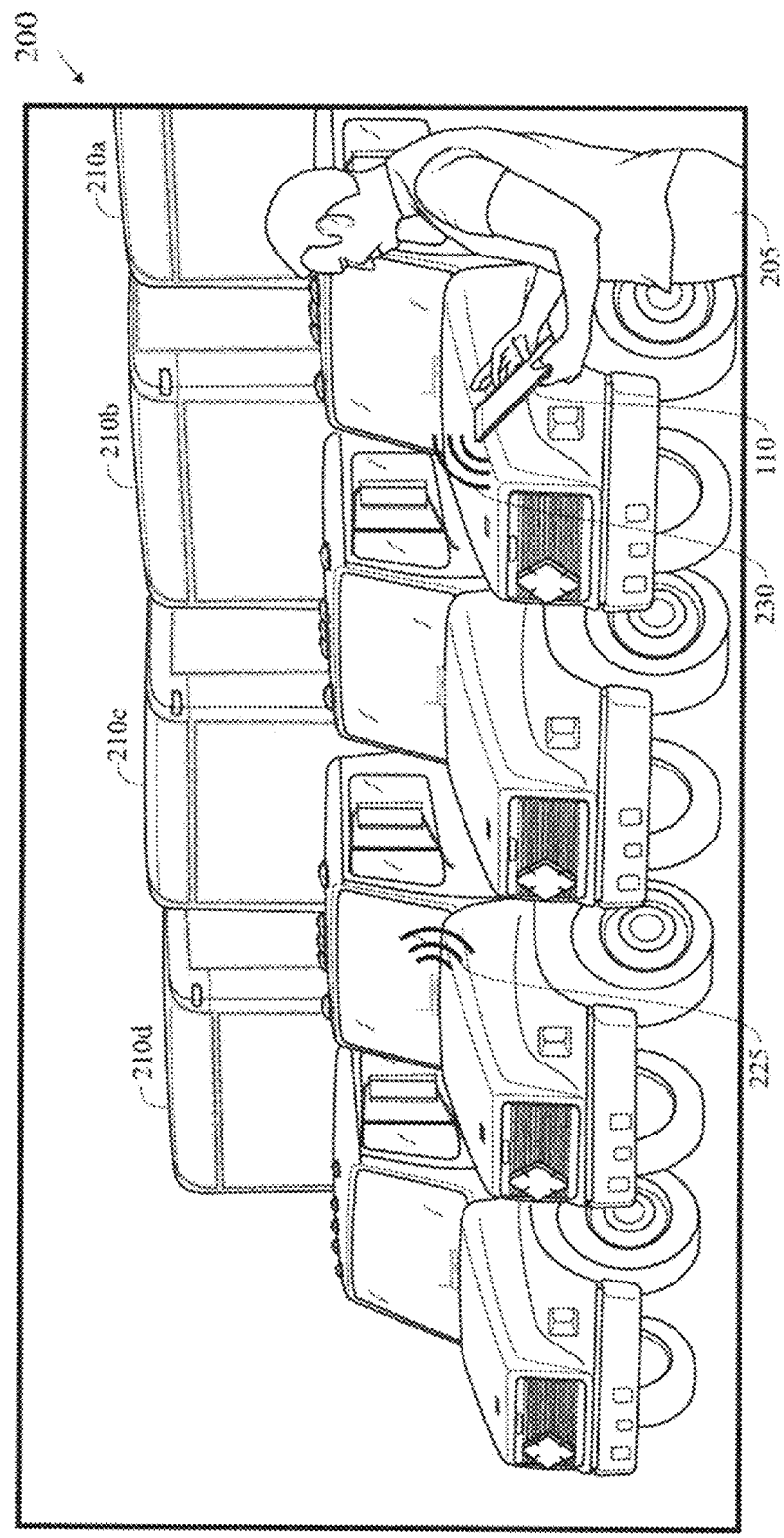
FIG. 3 is an illustration of a driver identifying a vehicle through connection of a tablet computer to an unpublished network.

As shown in FIG. 3, each of a multitude of trucks 210a-210d broadcast a wireless signal for a truck specific network, with one truck 210c broadcasting a wireless signal 225. However, the SSID is not published so unless a driver is already in possession of the SSID, the driver will not be able to pair the tablet computer 110 with the CVD 130 of the truck 210 to which the driver is assigned. So even though the wireless signals are being "broadcast", they will not appear on a driver's tablet computer 110 (or other mobile device) unless the tablet computer 110 has already been paired with the CVD 130 of the vehicle 210. A driver 205 in possession of a tablet computer 110 pairs, using a signal 230, the tablet computer 110 with the wireless network 225 of the CVD of the truck 210c, and thus the driver locates the specific truck 210c he is assigned to in a parking lot full of identical looking trucks 210a-d.

For example, on an IPHONE® device from Apple, Inc., the "UDID," or Unique Device Identifier is a combination of forty numbers and letters, and is set by Apple and stays with the device forever.

For example, on an ANDROID based system, one that uses Google Inc.'s ANDROID operating system, the ID is set by Google and created when an end-user first boots up the device. The ID remains the same unless the user does a "factory reset" of the phone, which deletes the phone's data and settings.

The mobile communication device 110, or mobile device, is preferably selected from mobile phones, smartphones, tablet computers, PDAs and the like. Examples of smartphones and the device vendors include the IPHONE® smartphone from Apple, Inc., the DROID® smartphone from Motorola Mobility Inc., GALAXY S® smartphones from Samsung Electronics Co., Ltd., and many more. Examples of tablet computing devices include the IPAD® tablet computer from Apple Inc., and the XOOM™ tablet computer from Motorola Mobility Inc.

The mobile communication device 110 then a communication network utilized preferably originates from a mobile communication service provider (aka phone carrier) of the customer such as VERIZON, AT&T, SPRINT, T-MOBILE, and the like mobile communication service providers, provide the communication network for communication to the mobile communication device of the end user.

Wireless standards utilized include 802.11a, 802.11b, 802.11g, AX.25, 3G, CDPD, CDMA, GSM, GPRS, radio, microwave, laser, Bluetooth, 802.15, 802.16, and IrDA.

BLUETOOTH™ technology operates in the unlicensed 2.4 GHz band of the radio-frequency spectrum, and in a preferred embodiment the secondary device 30 and/or primary device 25 is capable of receiving and transmitting signals using BLUETOOTH™ technology. LTE Frequency Bands include 698-798 MHz (Band 12, 13, 14, 17); 791-960 MHz (Band 5, 6, 8, 18, 19, 20); 1710-2170 MHz (Band 1, 2, 3, 4, 9, 10, 23, 25, 33, 34, 35, 36, 37, 39); 1427-1660.5 MH (Band 11, 21, 24); 2300-2700 MHz (Band 7, 38, 40, 41); 3400-3800 MHz (Band 22, 42, 43), and in a preferred embodiment the secondary device 30 and/or the primary device 25 is capable of receiving and transmitting signals using one or more of the LTE frequency bands. WiFi preferably operates using 802.11a, 802.11b, 802.11g, 802.11n communication formats as set for the by the IEEE, and in in a preferred embodiment the secondary device 30 and/or the primary device 25 is capable of receiving and transmitting signals using one or more of the 802.11 communication formats. Near-field communications (NFC) may also be utilized.

Figure 4:
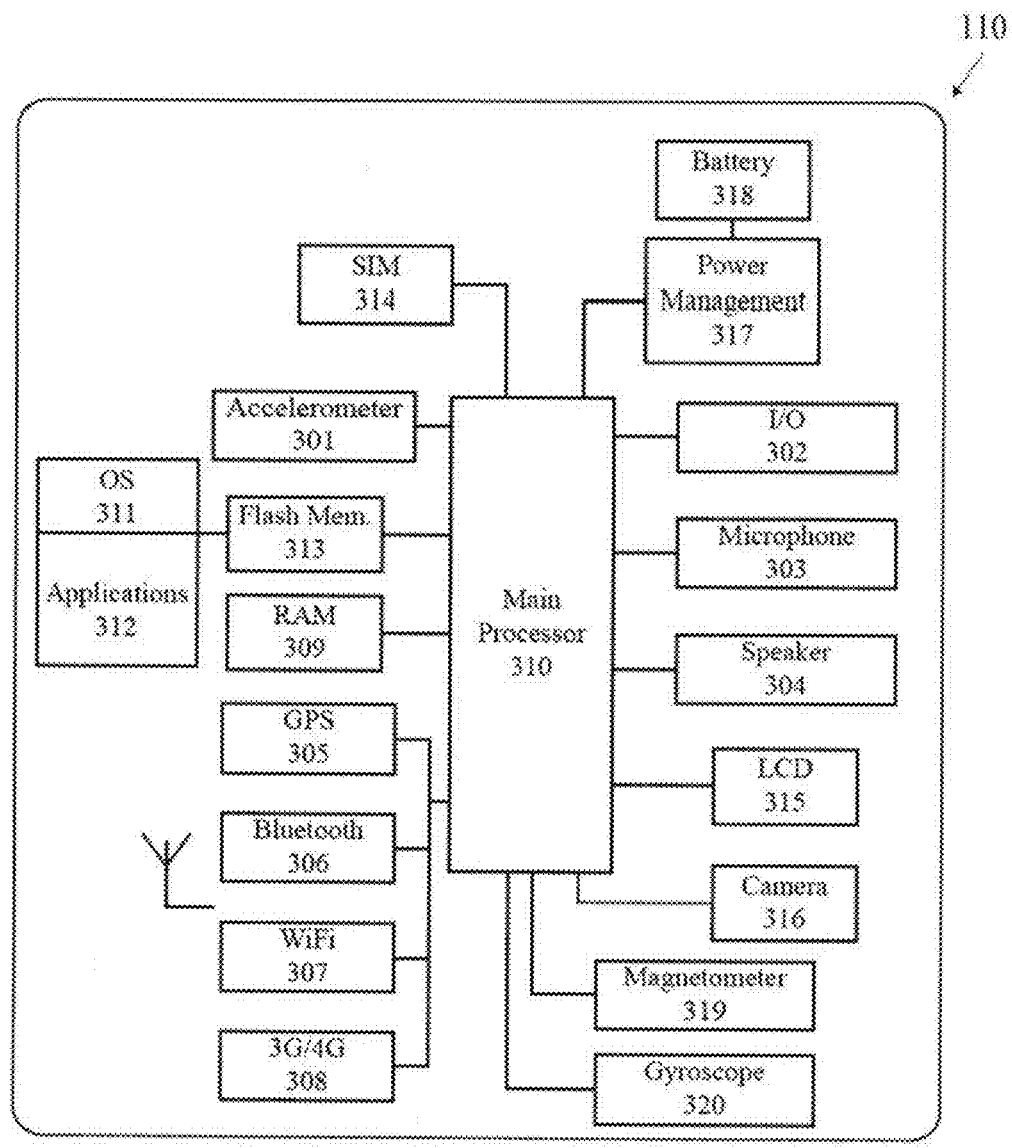
FIG. 4 is an isolated view of general electrical components of a mobile communication device.

As shown in FIG. 4, a typical mobile communication device 110 preferably includes an accelerometer 301, I/O (input/output) 302, a microphone 303, a speaker 304, a GPS chipset 305, a Bluetooth component 306, a Wi-Fi component 307, a 3G/4G component 308, RAM memory 309, a main processor 310, an OS (operating system) 311, applications/software 312, a Flash memory 313, SIM card 314, LCD display 315, a camera 316, a power management circuit 317, a battery 318 or power source, a magnetometer 319, and a gyroscope 320.

Each of the interface descriptions preferably discloses use of at least one communication protocol to establish handshaking or bi-directional communications. These protocols preferably include but are not limited to XML, HTTP, TCP/IP, Serial, UDP, FTP, Web Services, WAP, SMTP, SMPP, DTS, Stored Procedures, Import/Export, Global Positioning Triangulation, IM, SMS, MMS, GPRS and Flash. Databases that may be used with the system preferably include but are not limited to MSSQL, Access, MySQL, Progress, Oracle, DB2, Open Source DBs and others. Operating system used with the system preferably include Microsoft 2010, XP, Vista, 2000 Server, 2003 Server, 2008 Server, Windows Mobile, Linux, Android, Unix, I series, AS 400 and Apple OS.

The underlying protocol at the cloud server 11, is preferably Internet Protocol Suite (Transfer Control Protocol/Internet Protocol ("TCP/IP")), and the transmission protocol to receive a file is preferably a file transfer protocol ("FTP"), Hypertext Transfer Protocol ("HTTP"), Secure Hypertext Transfer Protocol ("HTTPS") or other similar protocols. The transmission protocol ranges from SIP to MGCP to FTP and beyond. The protocol at the authentication server 40 is most preferably HTTPS.

Wireless standards include 802.11a, 802.11b, 802.11g, AX.25, 3G, CDPD, CDMA, GSM, GPRS, radio, microwave, laser, Bluetooth, 802.15, 802.16, and IrDA.

Figure 5:
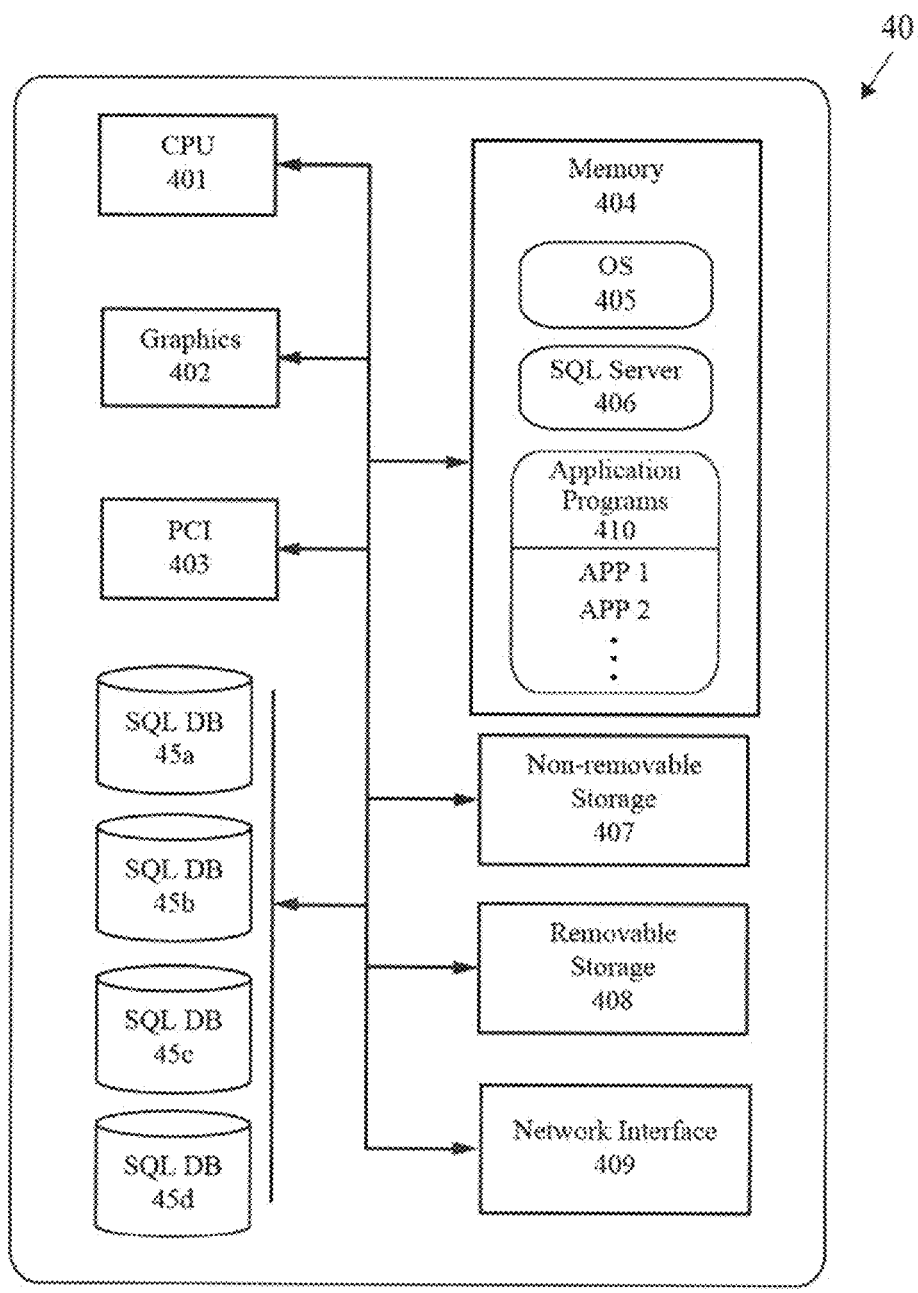
FIG. 5 is an isolated view of general electrical components of a server.

Components of a cloud computing server 40 of the system, as shown in FIG. 5, preferably includes a CPU component 401, a graphics component 402, PCI/PCI Express 403, memory 404, non-removable storage 407, removable storage 408, Network Interface 409, including one or more connections to a fixed network, and SQL database(s) 45*a*-45*d*, which includes the venue's CRM. Included in the memory 404, is an operating system 405, a SQL server 406 or other database engine, and computer programs/software 410. The server 40 also preferably includes at least one computer program configured to receive data uploads and store the data uploads in the SQL database. Alternatively, the SQL server can be installed in a separate server from the server 40.

Figure 6:
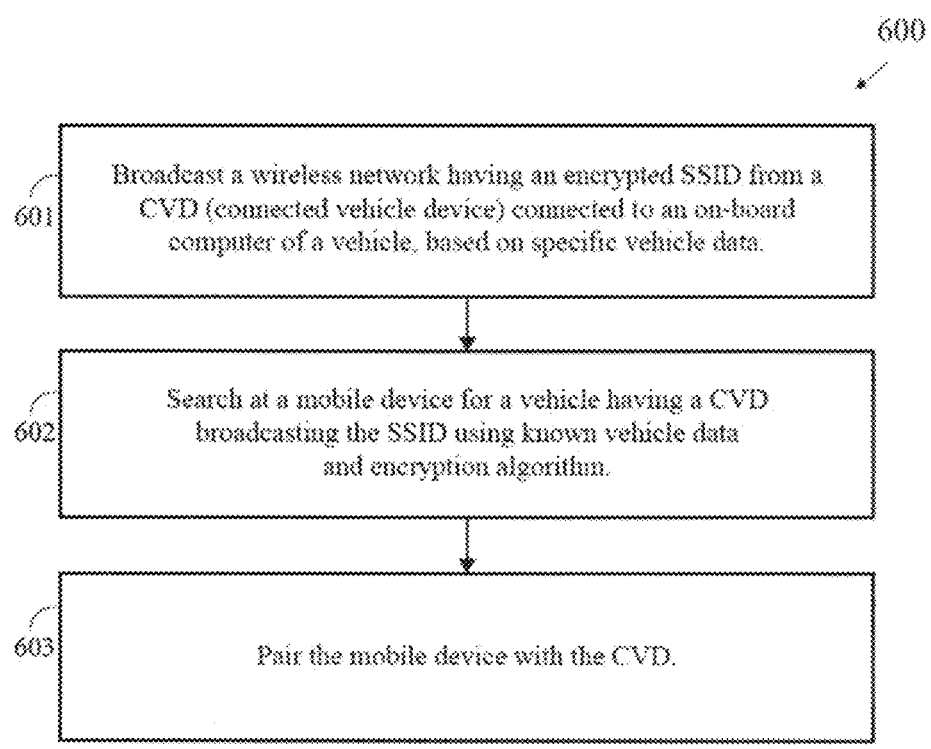
FIG. 6 is a flow chart of method for securely connecting a wireless device to a single access point in a vehicle.

A flow chart for an alternative method 600 for a secure connection to a wireless network of a vehicle is shown in FIG. 6. At block 601, the CVD broadcasts an encrypted, blind SSID based on specific vehicle data. At block 602, leveraging the known vehicle data and the encryption algorithm a mobile device searches for a vehicle having a CVD broadcasting the wireless network. At block 603, the mobile device is connected with the CVD.

Figure 7:
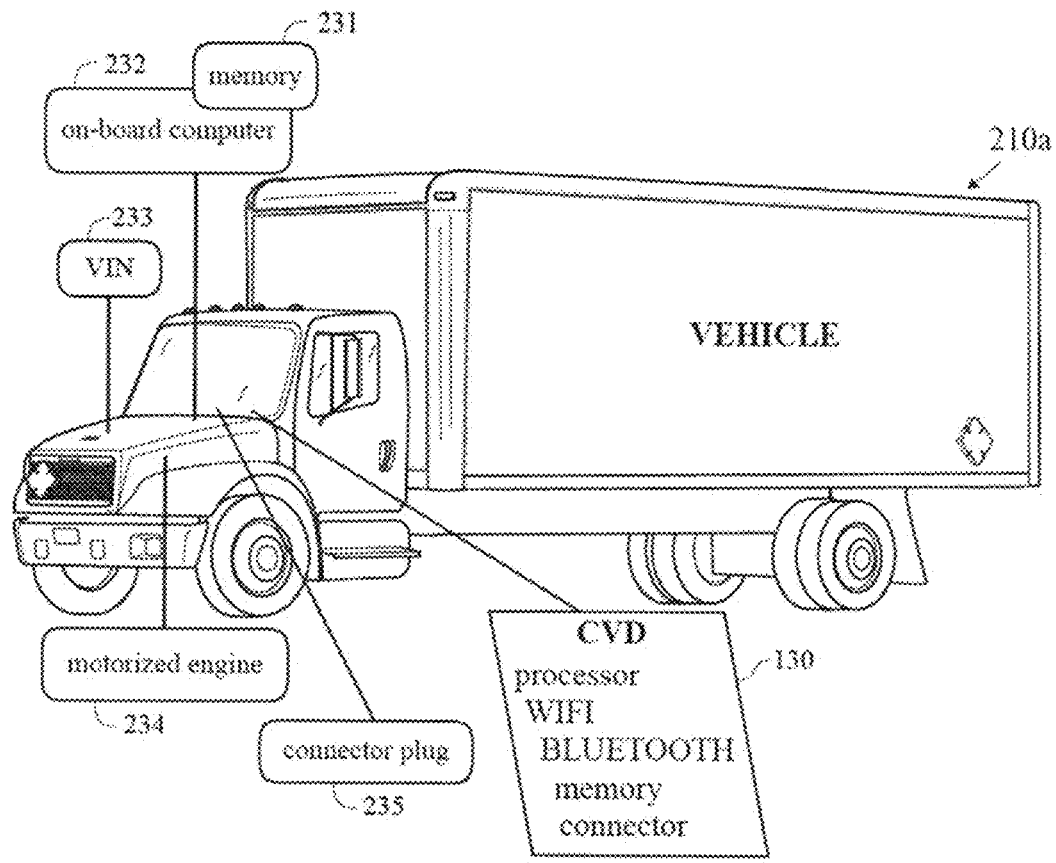
FIG. 7 is an illustration of a system for securely connecting a wireless device to a single access point in a vehicle.
Figure 7:
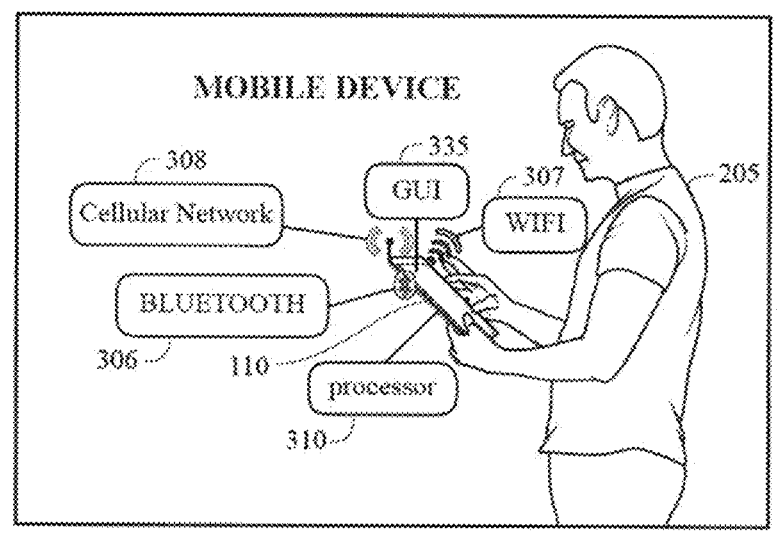

A system for a secure connection to a wireless network of a vehicle is shown in FIG. 7. A truck 210*a*. Those skilled in the pertinent art will recognize that the truck 210*a* may be replaced by any type of vehicle (such as a bus, sedan, pick-up, sport utility vehicle, limousine, sports car, delivery truck, van, mini-van, motorcycle, and the like) without departing from the scope of spirit of the present invention. The truck 210*a* preferably comprises a motorized engine 234, a vehicle identification number ("VIN"), an on-board computer 232 with a memory 231 and a connector plug 235. The on-board computer 232 preferably has a digital copy of the VIN in the memory 231. The on-board computer 232 is preferably in communication with the motorized engine 234. The truck 210*a* may also have a GPS component for location and navigation purposes, a satellite radio such as SIRIUS satellite radio, a driver graphical interface display, a battery, a source of fuel and other components found in a conventional long distance truck.

Also in the truck 210*a* is a CVD 130 comprising a processor, a WiFi radio, a BLUETOOTH radio, a memory and a connector to connect to the connector plug of the on-board computer 232.

A driver 205 preferably has a mobile communication device such as a tablet computer 110 in order to pair with a wireless network generated by the CVD 130 of the truck 210*a*. The tablet computer 110 preferably comprises a graphical user interface 335, a processor 310, a WiFi radio 307, a BLUETOOTH radio 306, and a cellular network interface 308.

Figure 8:
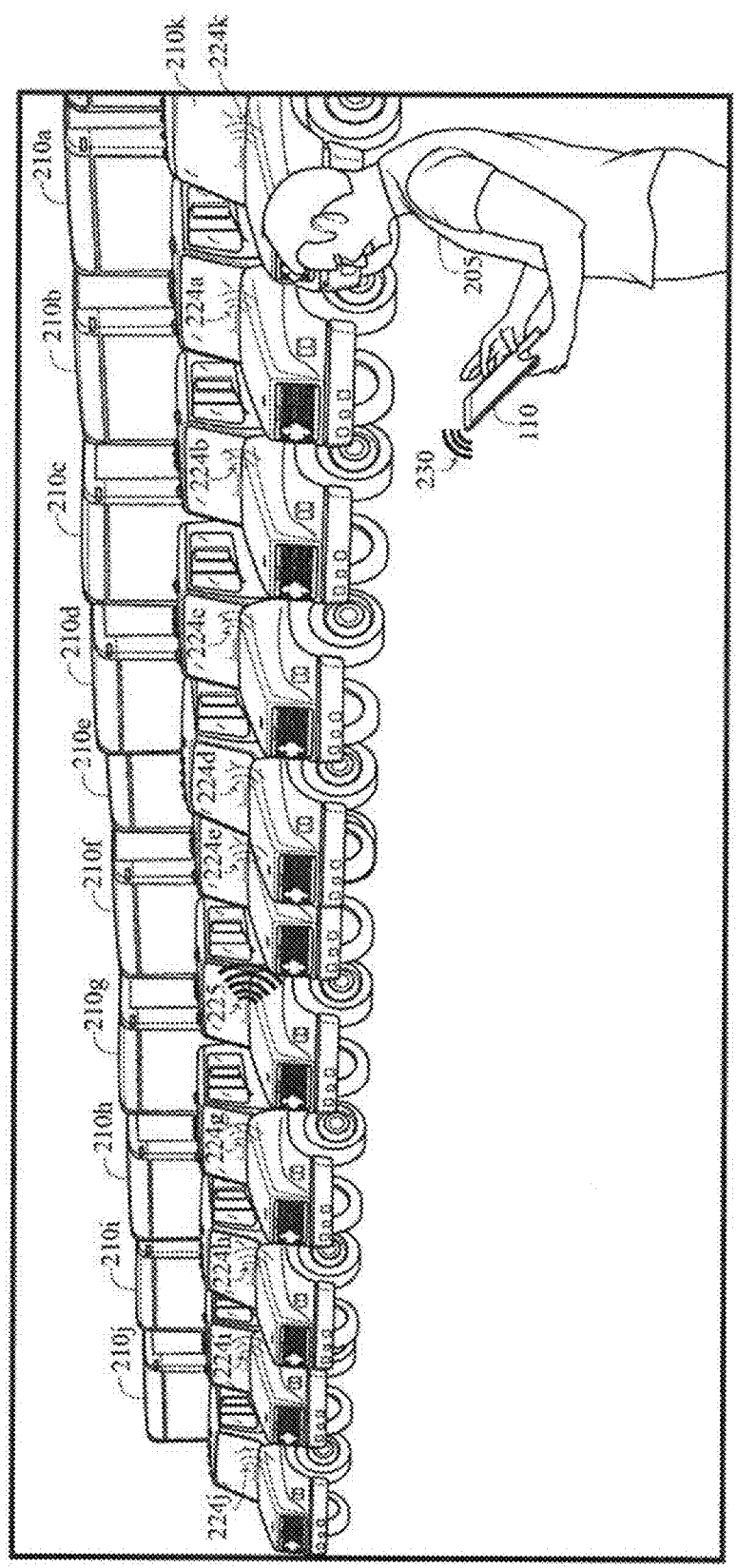
FIG. 8 is an illustration of a driver identifying a vehicle through connection of a tablet computer to an unpublished network.

As shown in FIG. 8, each of a multitude of trucks 210*a*-210*k* broadcast a wireless signal 224*a*-*k* for a truck specific network, with one truck 210*f* broadcasting a wireless signal 225. However, all of the wireless signal 224*a*-224*k* and 225 do not publish their respective SSID so that a mobile device 110 must already be paired with the CVD 130 of the truck 210 in order to connect to the truck based wireless network 224*a*-224*k* or 225 of each of the CVDs 130 of each of the trucks 210*a*-210*k*. A driver 205 in possession of a tablet computer 110 pairs with the specific truck wireless network 225 of the CVD 130 of the truck 210*f*, and thus the driver locates the specific truck 210*f* he is assigned to in a parking lot full of identical looking trucks 210*a*-210*k*.

Kennedy, et al., U.S. Pat. No. 10,917,921 for Secure Wireless Networks For Vehicles, is hereby incorporated by reference in its entirety.

Son et al., U.S. Pat. No. 10,475,258 for a Method And System For Utilizing Vehicle Odometer Values And Dynamic Compliance is hereby incorporated by reference in its entirety.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

We claim as our invention the following:

1. A method for a secure connection to a wireless network of a vehicle, the method comprising:
    transmitting, from a server to a connected vehicle device (CVD) and a mobile device, a plurality of definitions for a secure connection packet (SCP) for an assigning authority for a vehicle;
    receiving at the server, for authorization, a CVD compiled SCP from the CVD;
    transmitting the authorization for the CVD compiled SCP from the server to the CVD for creation of a validated SCP;
    broadcasting at the CVD a secure wireless network with a hidden and hashed SSID unique to the vehicle and protected by a passphrase, the hidden and hashed SSID and passphrase generated from the validated SCP; and
    connecting, over the secure wireless network, the CVD to a mobile device that generated the hashed SSID and the passphrase from a dataset generated from the plurality of definitions.

2. The method according to claim 1 wherein the dataset comprises at least one of a mobile device ID, a driver ID, a vehicle ID, a passive device ID advertised wirelessly, identified or defined entity/participant to the transaction, descriptions, actions, or states of thing, characteristics of identifiable devices, when present in a certain proximity and/or context.

3. The method according to claim 1 further comprising connecting the mobile device to a passive device, the passive device operating on a BLUETOOTH communication protocol.

4. The method according to claim 1 wherein the server transmits instructions to the mobile device to compile the SCP based on a proximity to the vehicle at a predetermined time, wherein the server is instructed by an assigning authority to generate the plurality of definitions for the SCP based on a contextual grouping the assigning authority wants to allow in the future to permit an automatic connection to occur between the mobile device and the CVD.

5. The method according to claim 3 wherein the passive device is at least one of an internal device in the vehicle or an external device posted on a gate to a facility and generating a beacon.

6. The method according to claim 1 wherein the vehicle comprises an on-board computer with a memory having a vehicle identification number (VIN), a connector plug, and a motorized engine.

7. A system for vehicle to mobile device secure wireless communications, the system comprising:
a vehicle comprising an on-board computer with a memory having a vehicle identification number (VIN), a connector plug, and a motorized engine;
a connected vehicle device (CVD) for the vehicle; and
a mobile device;
wherein the server is configured to generate a plurality of definitions for a secure connection packet (SCP) for an assigning authority for the vehicle;
wherein the server is configured to transmit the plurality of definitions for the SCP from the server to the CVD and the mobile device;
wherein the server is configured to receive a CVD compiled SCP generated from the plurality of definitions;
wherein the server is configured to transmit authorization for the CVD compiled SCP to the CVD for creation of a validated SCP;
wherein the CVD is configured to broadcast a secure wireless network with a hidden and hashed SSID unique to the vehicle and protected by a passphrase, the hidden and hashed SSID and passphrase generated from the validated SCP;
wherein the mobile device is configured to generate the hashed SSID and the passphrase from a dataset generated from the plurality of definitions for the SCP, which allows the mobile device to connect to the wireless network for the vehicle;
and
wherein the mobile device is configured to search for and connect to the CVD over the secure wireless network.

8. The system according to claim 7 wherein the dataset comprises at least one of a mobile device ID, a driver ID, a vehicle ID, a passive device ID advertised wirelessly, identified or defined entity/participant to the transaction, descriptions, actions, or states of thing, characteristics of identifiable devices, when present in a certain proximity and/or context.

9. The system according to claim 7 further comprising a passive device which is a BLUETOOTH enabled device advertising a unique ID as a beacon or a complex system that emits BLUETOOTH enabled device advertising a unique ID as a beacon.

10. The system according to claim 7 further comprising a passive device which is an internal device in the vehicle or an external device posted on a gate to a facility and generating a beacon.

11. The system according to claim 7 wherein the CVD obtains a vehicle identification number (VIN) from an on-board computer and the mobile device receives input from a driver of the vehicle.

12. A method for a secure connection to a wireless network of a vehicle, the method comprising:
receiving, at a connected vehicle device (CVD), a plurality of definitions for a secure connection packet (SCP) from a server;
compiling the plurality of definitions for the SCP at the CVD to generate a CVD compiled SCP;
receiving at the CVD, authorization from the server for a validated SCP for the CVD compiled SCP;
broadcasting at the CVD a secure wireless network with a hidden and hashed SSID unique to the vehicle and protected by a passphrase, the hidden and hashed SSID and passphrase generated from the validated SCP; and
connecting, over the secure wireless network, the CVD to a mobile device that generated the hashed SSID and the passphrase from a dataset generated from the plurality of definitions.

13. The method according to claim 12 wherein the CVD comprises a processor, a WiFi radio, a BLUETOOTH radio, a memory, and a connector for mating with a connector plug of a vehicle.

14. The method according to claim 12 wherein the mobile device comprises a graphical user interface, a BLUETOOTH radio, a processor, a WiFi radio and a cellular network interface.

15. The method according to claim 12 wherein the dataset comprises at least one of a mobile device ID, a driver ID, a vehicle ID, a passive device ID advertised wirelessly, identified or defined entity/participant to the transaction, descriptions, actions, or states of thing, characteristics of identifiable devices, when present in a certain proximity and/or context.

16. The method according to claim 12 further comprising connecting the mobile device to a passive device, the passive device operating on a BLUETOOTH communication protocol.

17. The method according to claim 16 wherein the passive device is a BLUETOOTH enabled device advertising a unique ID as a beacon or a complex system that emits BLUETOOTH enabled device advertising a unique ID as a beacon.

18. The method according to claim 16 wherein the passive device is at least one of an internal device in the vehicle or an external device posted on a gate to a facility and generating a beacon.

19. The method according to claim 12 wherein the vehicle comprises an on-board computer with a memory having a vehicle identification number (VIN), a connector plug, and a motorized engine.

20. The method according to claim 12 wherein the wireless network is a WiFi network.

* * * * *